May 2, 1939.  J. W. BRYCE  2,156,969
TABULATING MACHINE
Filed Oct. 25, 1933   10 Sheets-Sheet 1

INVENTOR
James W. Bryce
BY
ATTORNEY

May 2, 1939. J. W. BRYCE 2,156,969
TABULATING MACHINE
Filed Oct. 25, 1933 10 Sheets-Sheet 2

INVENTOR
James W. Bryce
BY
ATTORNEY

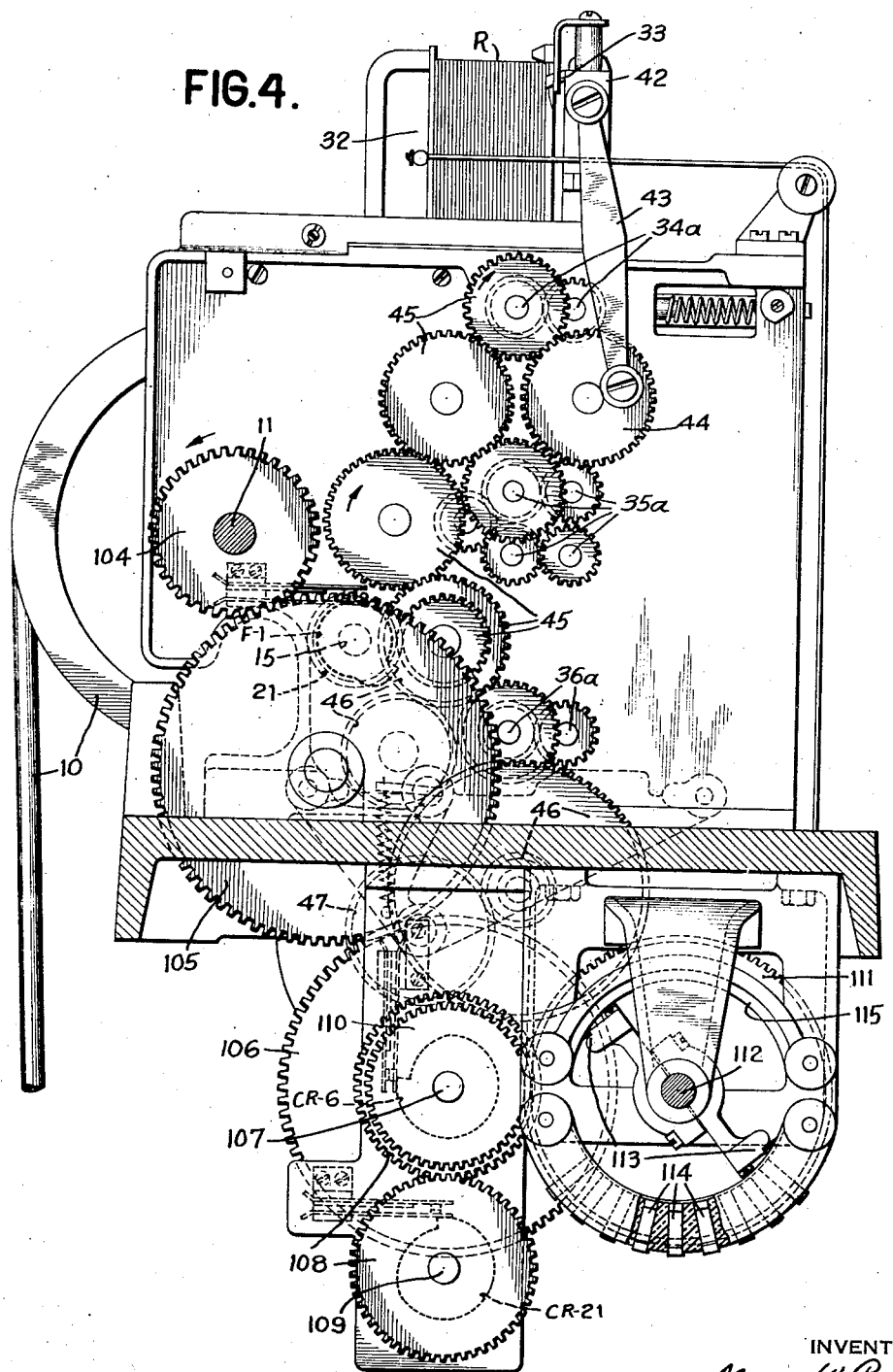

May 2, 1939.  J. W. BRYCE  2,156,969
TABULATING MACHINE
Filed Oct. 25, 1933   10 Sheets-Sheet 5

INVENTOR
James W. Bryce
BY
ATTORNEY

May 2, 1939.  J. W. BRYCE  2,156,969
TABULATING MACHINE
Filed Oct. 25, 1933  10 Sheets-Sheet 6
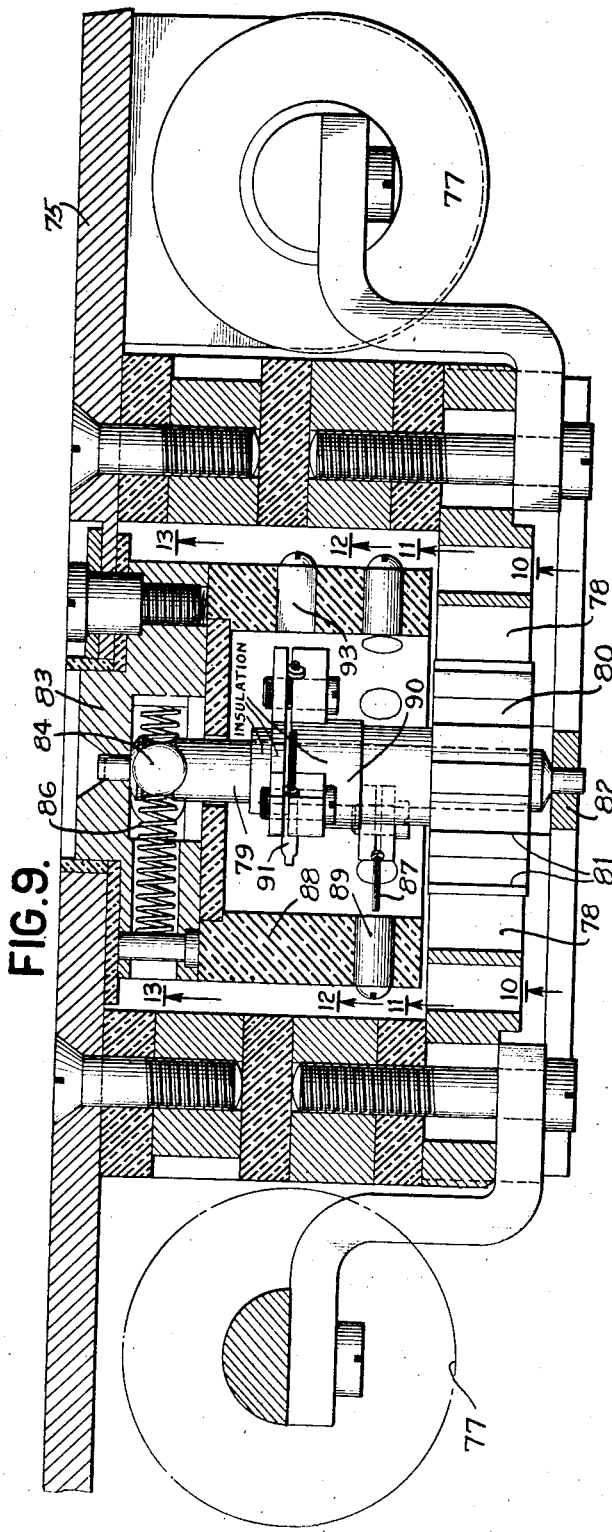
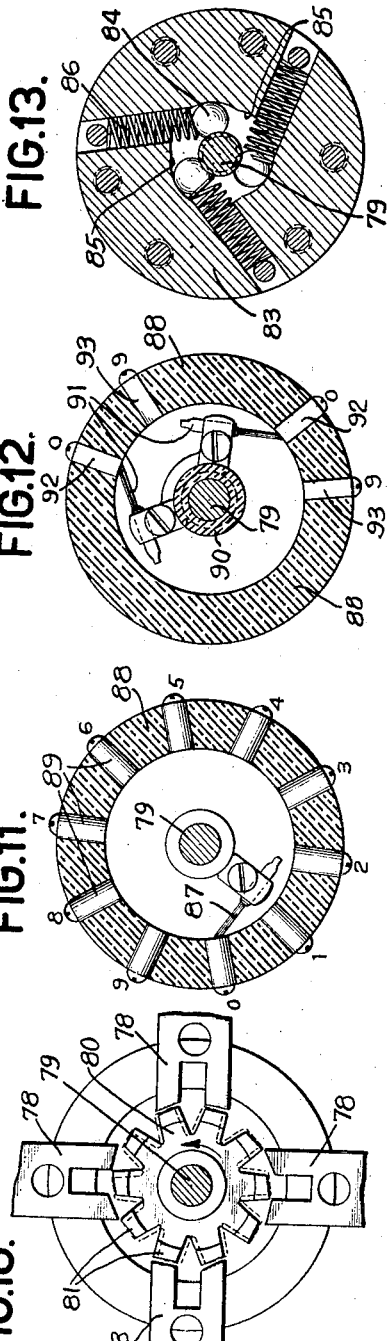
INVENTOR
james W. Bryce
BY
ATTORNEY

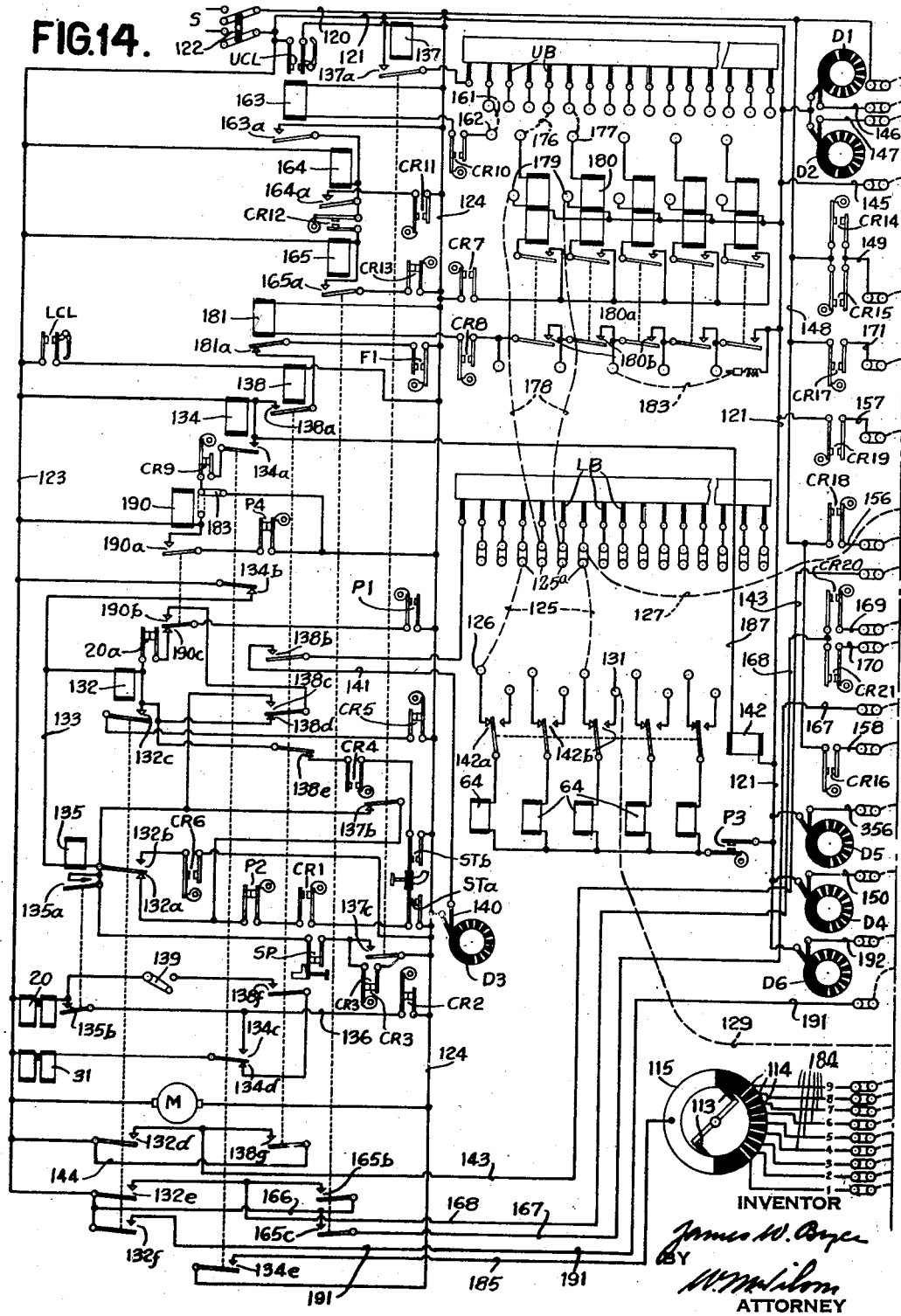

May 2, 1939.  J. W. BRYCE  2,156,969
TABULATING MACHINE
Filed Oct. 25, 1933   10 Sheets-Sheet 8
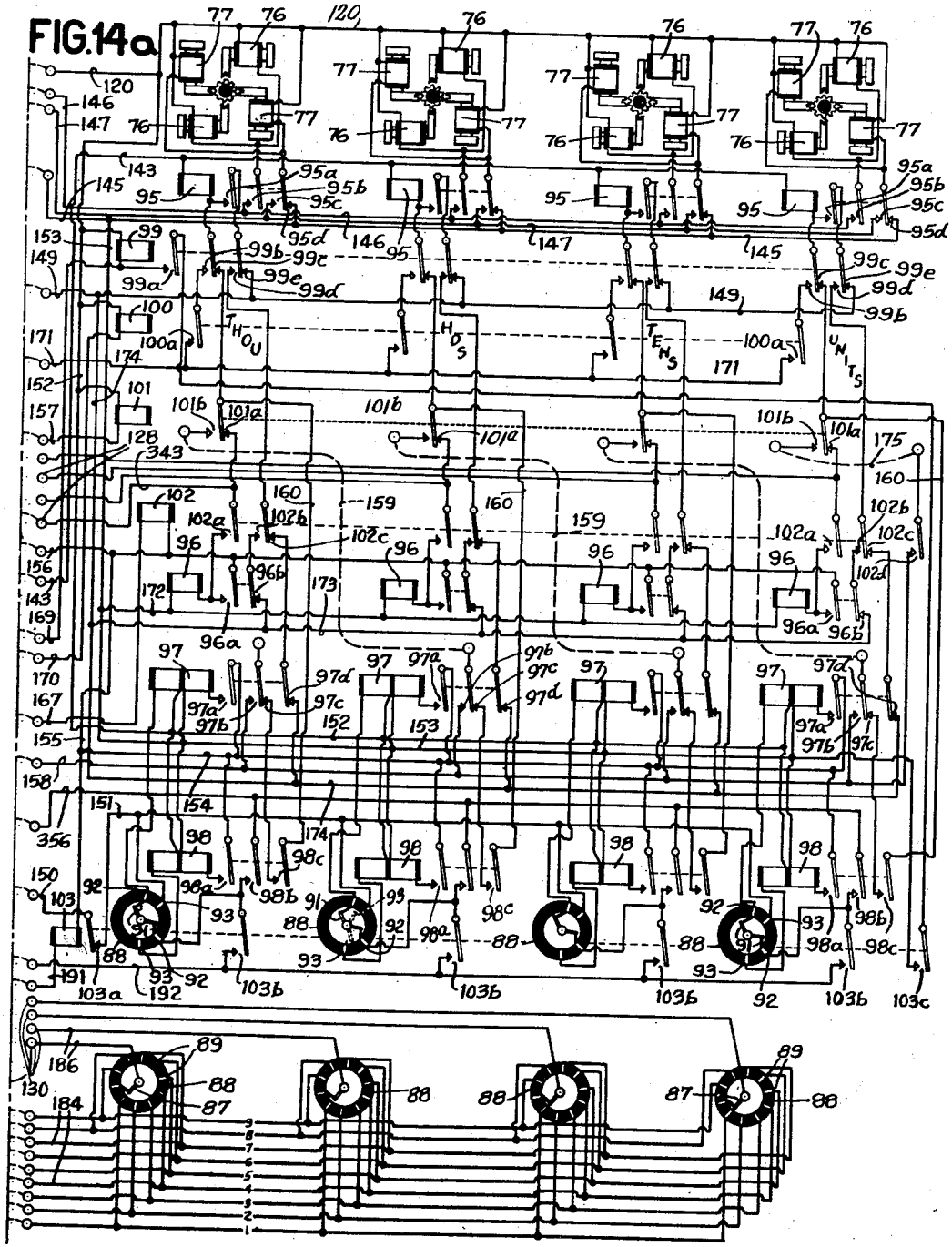
INVENTOR
James W. Bryce
BY
ATTORNEY May 2, 1939.  J. W. BRYCE  2,156,969
TABULATING MACHINE
Filed Oct. 25, 1933   10 Sheets-Sheet 9
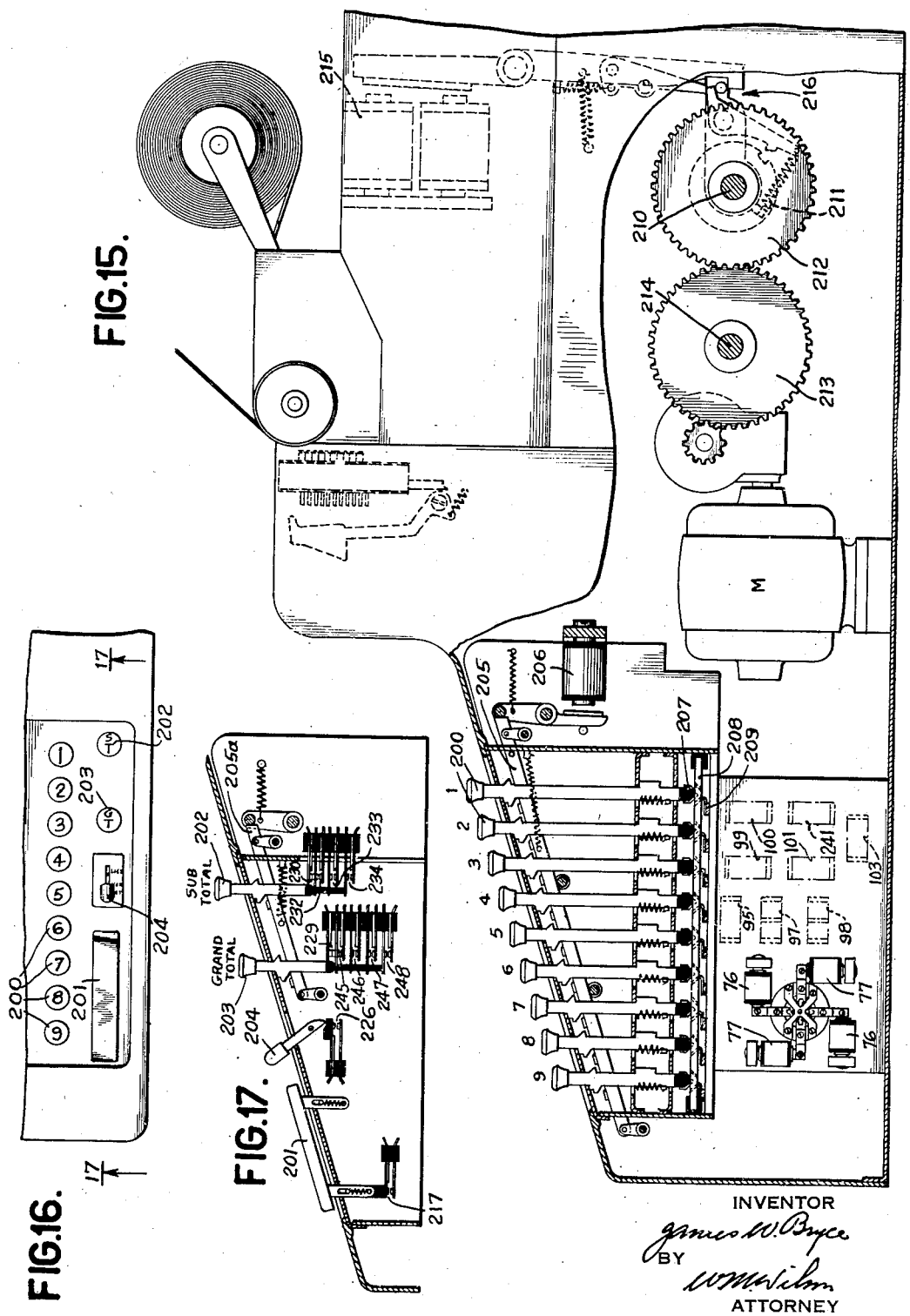
INVENTOR
James W. Bryce
BY
W. M. Wilson
ATTORNEY May 2, 1939.  J. W. BRYCE  2,156,969
TABULATING MACHINE
Filed Oct. 25, 1933  10 Sheets-Sheet 10
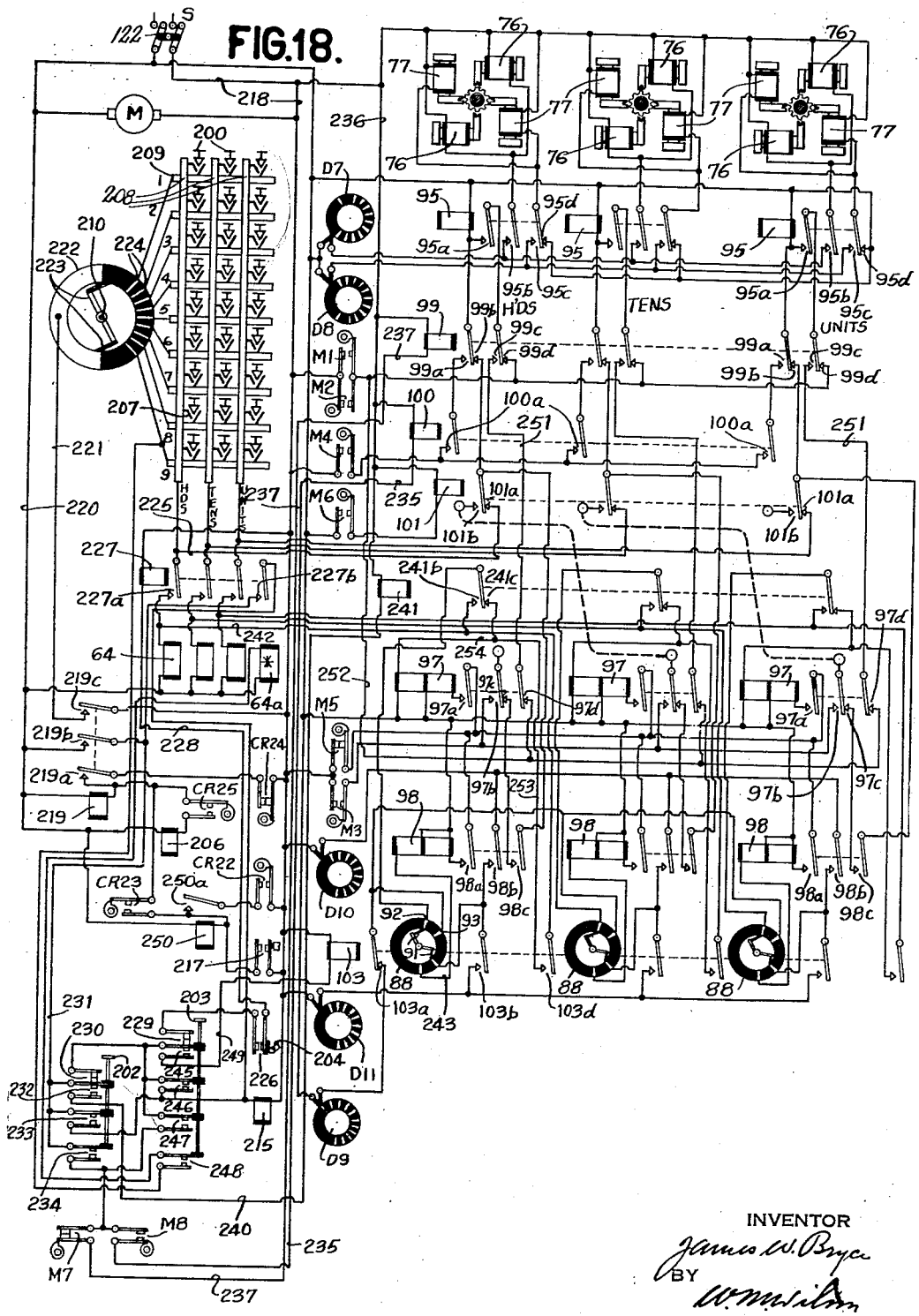
INVENTOR
James W. Bryce
BY
W. M. Wilson
ATTORNEY Patented May 2, 1939

2,156,969

UNITED STATES PATENT OFFICE 2,156,969

TABULATING MACHINE

James W. Bryce, Bloomfield, N. J., assignor to International Business Machines Corporation, New York, N. Y., a corporation of New York Application October 25, 1933, Serial No. 695,091

16 Claims. (Cl. 235—61.8)

This invention relates to accounting machines and more particularly to accounting machines of the record controlled type.

The principal object of the invention is to provide an accumulating mechanism for tabulating machines of improved form and selectivity of operation whereby computing may be effected with greater efficiency, accuracy, and speed than heretofore and in which the number of moving parts is considerably less than in previous accumulating mechanisms.

A more specific object is to provide an improved form of electromagnetic accumulator in which the accumulating element comprises an armature adapted for rotation under control of a pair of alternately established magnetic fields and in which the entry of an amount in each denominational order is effected by repeated alternation in the direction in which the pair of magnetic fields is established.

A further object is to provide an electromagnetically operated accumulator in which the several denominational orders are mechanically independent of one another and in which improved transfer mechanism is provided for carrying from one order to the next higher order.

A further object of the invention is to provide an improved subtracting accumulator in which the amount to be subtracted is entered additively in its complementary value.

Various other objects and advantages of the invention will be obvious from the following particular description of two forms of mechanism embodying the invention or from an inspection of the accompanying drawings; and the invention also constitutes certain new and novel features of construction and combination of parts hereinafter set forth and claimed.

In the drawings:

Fig. 4 is a section taken along lines 4—4 of Fig. 1, showing the driving connections for the card feeding and analyzing unit.

Fig. 9 is a sectional view taken along the lines 9—9 of Fig. 7, showing the arrangement and construction of one of the accumulating units.

Figs. 10, 11, 12, and 13 are sectional views taken on Fig. 9 as indicated thereon.

Figs. 14 and 14a, placed side by side, constitute a wiring diagram of the electric circuits of the machine.

Fig. 15 shows a modified form of the invention, disclosing key entry devices for controlling the operation of the accumulators.

Fig. 16 is a partial plan view of the keyboard of the modification.

Fig. 17 is a detail view taken on line 17—17 of Fig. 16, disclosing certain of the operating keys of the modified form of the invention.

Fig. 18 is a wiring diagram of the electric circuits of the modified form of the invention.

General arrangement

Figure 1:
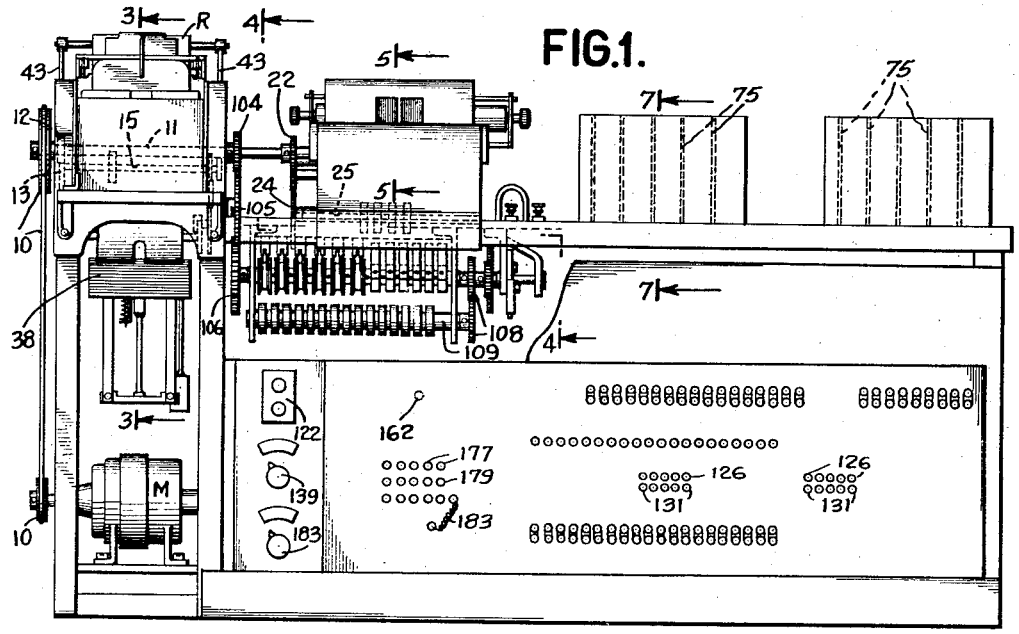
Fig. 1 is a general assembly view of the machine, showing the location and arrangement of the several units.

The several main units of the machine are arranged as shown in Fig. 1 with the card feeding and analyzing unit at the left through which record cards are fed singly past analyzing brushes which sense the data represented by differentially located perforations. The printing mechanism is located adjacent to the card feeding unit and is adapted to be controlled by the circuits completed through the card perforations to record in printed form the significance of the perforations analyzed. The accumulating units are located to the right of the printing unit and each comprises a number of individual adding units. These accumulating units are preferably arranged in groups of five adding units and two such groups are shown mounted upon the main frame of the machine. They have no mechanical connection with the remainder of the machine and may accordingly be located in any position with respect to the rest of the mechanism. If desired, they may be placed at a point remote from the machine proper and as many units may be employed as is consistent with the character of the work to be performed by the machine.

Beneath the printing and accumulating units is the plugboard provided with suitable plug sockets through which the several units may be coordinated in accordance with the requirements of the work to be performed.

Driving system

Figure 3:
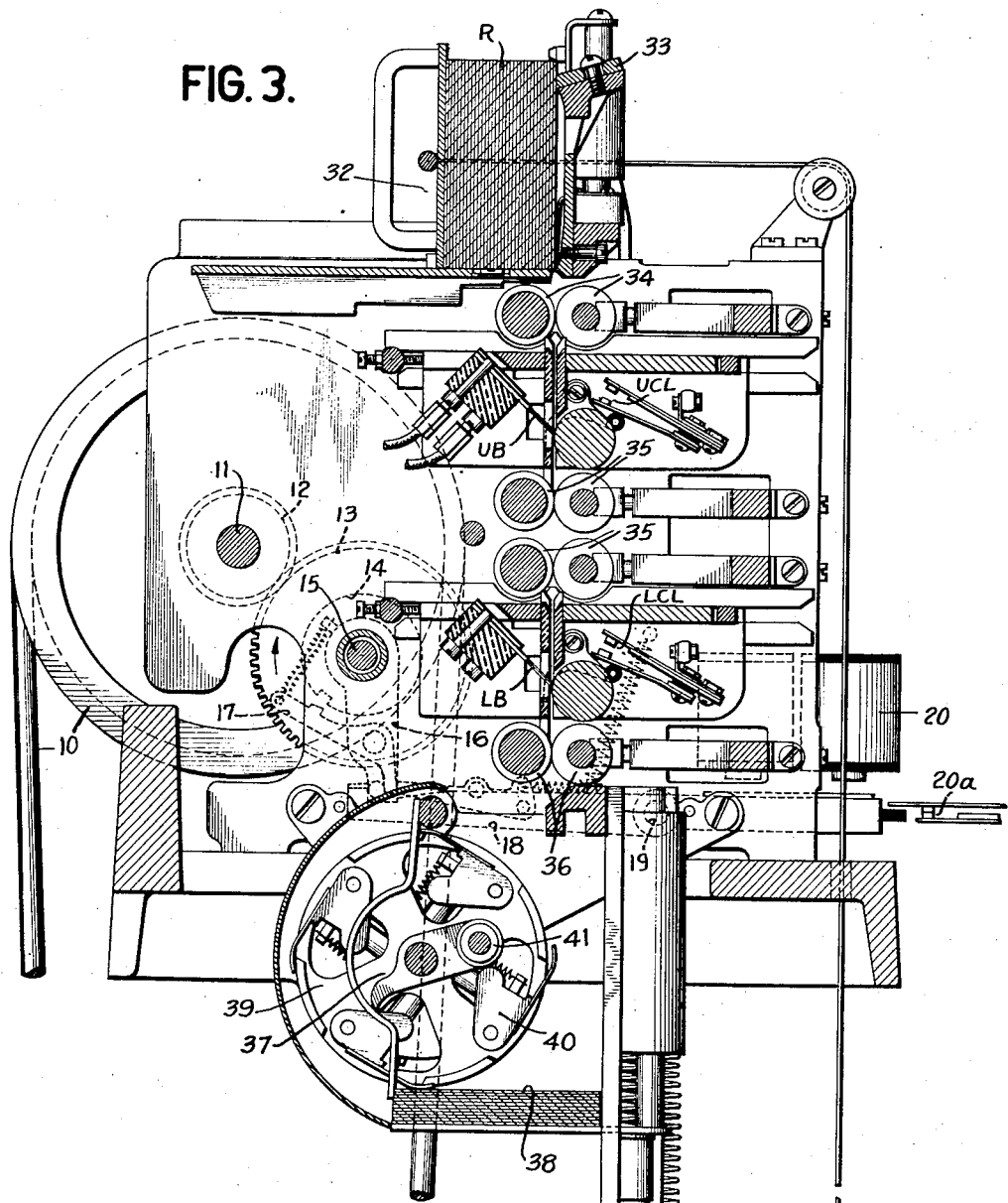
Fig. 3 is a central section through the card feeding and analyzing unit of the machine. The section is taken substantially along the lines 3—3 of Fig. 1.

Energy for driving the mechanical devices of the machine is supplied by a motor M (Fig. 1) which has belt and pulley connection 10 (see also Fig. 3) with a shaft 11. Mounted on shaft 11 is a gear 12 meshing with a gear 13 which is integral with a clutch driving member 14 freely mounted upon shaft 15. Secured to the shaft 15 is an arm 16 which carries a spring-pressed clutching dog 17 normally held in position as shown in Fig. 3 by clutch releasing arm 18 pivoted at 19 and controlled in its operation by a magnet 20. Energization of magnet 20 will open contacts 20a and will rock arm 18 in a counter-clockwise direction to release dog 17 for engagement with clutch driving member 14 and thereafter shaft 15 will rotate with gear 13 until magnet 20 is deenergized and lever 18 consequently causes disengagement of the clutch connection. In Fig. 4, shaft 15 is provided with a gear 21 by means of which the card feeding and analyzing unit of the machine is operated. This unit will be described in further detail hereinafter.

The shaft 11 extends through the card feeding unit to the printing mechanism and carries a gear 22 (Fig. 5) which, through idlers 23, drives a gear 24 freely rotatable on shaft 25. A clutch driving member 26 is integral with gear 24 and cooperates with a spring-pressed clutching dog 27 carried by an arm 28 secured to shaft 25. Arm 28 and dog 27 are retained in the position shown in Fig. 5 by arm 29 pivoted at 30. Arm 29 is controlled by magnet 31 which, upon energization, will rock the arm 29 in a counterclockwise direction to release arm 28 and dog 27 for engagement by the latter with driving member 26.

It will thus be apparent that both the card feeding unit and the printing unit may be connected through their respective clutching mechanisms with the main driving shaft 11 of the machine so that the card feeding unit may operate independently of the printing unit and vice versa.

Card feeding and analyzing mechanism

When the card feeding unit is clutched to the main drive shaft 11, the record cards R are fed downwardly one by one from the supply magazine 32 by a reciprocating picker knife 33 which advances the lower or leading edge of the card to a pair of feed rollers 34 which thereafter advance it past a set of upper brushes UB to further sets of feed rollers 35 which continue the card downwardly past a lower set of analyzing brushes LB after which feed rollers 36 advance the card to stacker mechanism, generally designated 37, for deposit upon discharge stack 38. The stacker comprises a drum 39 provided with a number of spring-pressed, pivoted card receiving clips 40 which are adapted to successively engage a stationary cam roller 41 as the clips pass the same. This action takes place as the leading edge of the card approaches the drum and is timed so that the leading edge is gripped by the clip as it moves out of engagement with the roller.

In Fig. 4 is shown the driving mechanism for the picker 33 and the several sets of feed rollers. The former is carried by a crosshead 42 which has link connection 43 with an eccentric stud in a gear 44. Gear 44 is driven from the gear 21 on shaft 15 through a chain of gearing, generally designated 45, which, with further gearing as indicated, serves to drive the shafts 34a of rollers 34, shafts 35a of rollers 35 and shafts 36a of rollers 36. One of the gears 45 through a chain of gears, generally designated 46, also serves to drive gear 47 which is secured to the stacker drum 39.

Printing mechanism

Figure 5:
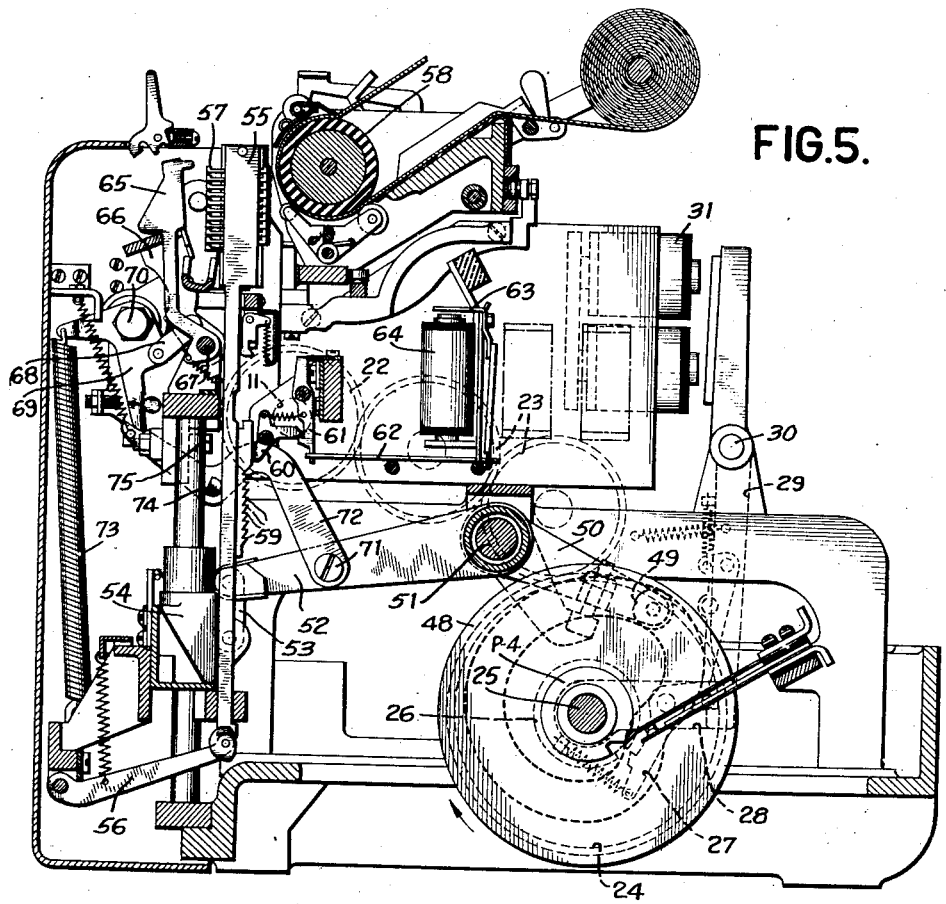
Fig. 5 is a central section of the printing mechanism of the machine taken substantially along the lines 5—5 of Fig. 1.

The printing mechanism is shown in Fig. 5 and is driven, as explained above, from shaft 25 which carries a box cam 48. A follower roller 49 controlled by the cam groove is carried by an arm 50 and causes oscillation of a shaft 51. Secured to shaft 51 is a pair of arms 52 which have link connection 53 to a vertically slidable crosshead 54 which, when the card feeding unit and printing unit are both in operation, will reciprocate once for each card fed through the feeding mechanism. Slidably mounted on cross-head 54 are type carriers 55 normally held in the position shown in Fig. 5 by spring-pressed arms 56. As the crosshead moves upwardly, arms 56 will urge type carriers 55 to follow and type elements 57 will be successively presented to the printing platen 58. Each type carrier is provided with a number of ratchet shaped teeth 59 which cooperate with spring-pressed stopping dog 60 normally held in the position shown by a latch 61 which is connected through a call wire 62 to the L-shaped armature 63 of print magnet 64, there being a magnet and connecting mechanism for each type carrier. Magnet 64 may be energized at differential times during the upward movement of the type carriers and such energization will cause latch 61 to release pawl 60 for engagement with one of the teeth 59, thereby interrupting further upward movement of the associated carrier without interfering with the invariable movement of the crosshead.

A printing hammer 65 is provided for each type carrier and as the latter are moving upwardly, the hammers are retracted, that is, permitted to rock in a counterclockwise direction.

At the end of the upward stroke of the crosshead after the several type carriers have been positioned, the type hammers are forceably rocked in a clockwise direction against the positioned type elements to take an impression therefrom. The mechanism for operating the type hammers comprises a bail 66 pivoted at 67 and having link connection 68 with a member 69 pivoted at 70. Arm 52 has pivoted thereto at 71 a member 72 whose free end engages an arm of member 69 and causes the latter to rock in a clockwise direction against the action of its spring 73 as the crosshead 54 rises. Near the upward extremity of the movement of crosshead 54, a pin 74 in member 72 will engage a fixed stop 75 to cause the free end of the member 72 to release dog 69 whereupon spring 73 will return member 69 to its normal position and through link 68 swing bail 66 and hammers 65 rapidly in a clockwise direction to effect printing.

The card feeding, analyzing, and the printing mechanisms just described are similar to like mechanisms in tabulating machines heretofore devised insofar as their general organization and manner of operation are concerned and the description thereof has accordingly been limited to those features essential to an understanding of the present invention.

Accumulating mechanism

The accumulating mechanism, whose construction and manner of operation constitute the main novelty of the invention, will now be explained in detail with particular reference to its organization, after which the circuit diagram will be explained to point out the manner in which the accumulating mechanism is coordinated with the card feeding and printing units.

The accumulating unit, as hereinbefore stated, comprises a plurality of individual denominational orders which have no mechanical connection with one another and since all orders are identical in their structural organization a detailed description of one will suffice for all.

Figure 7:
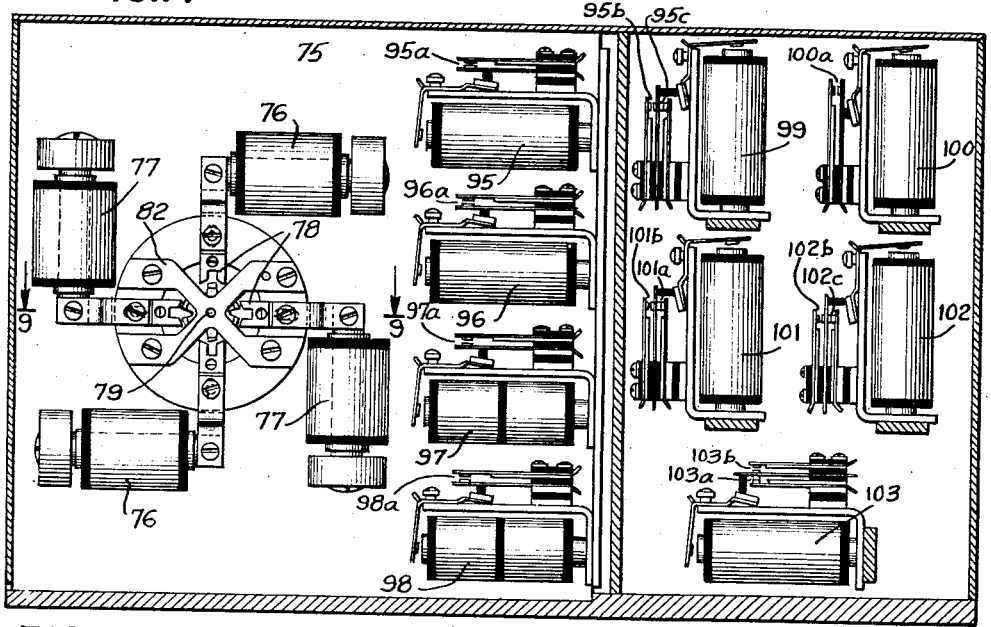
Fig. 7 is a detail view of one of the denominational order units of the accumulating mechanism, the section being taken substantially along lines 7—7 of Fig. 1.
Figure 8:
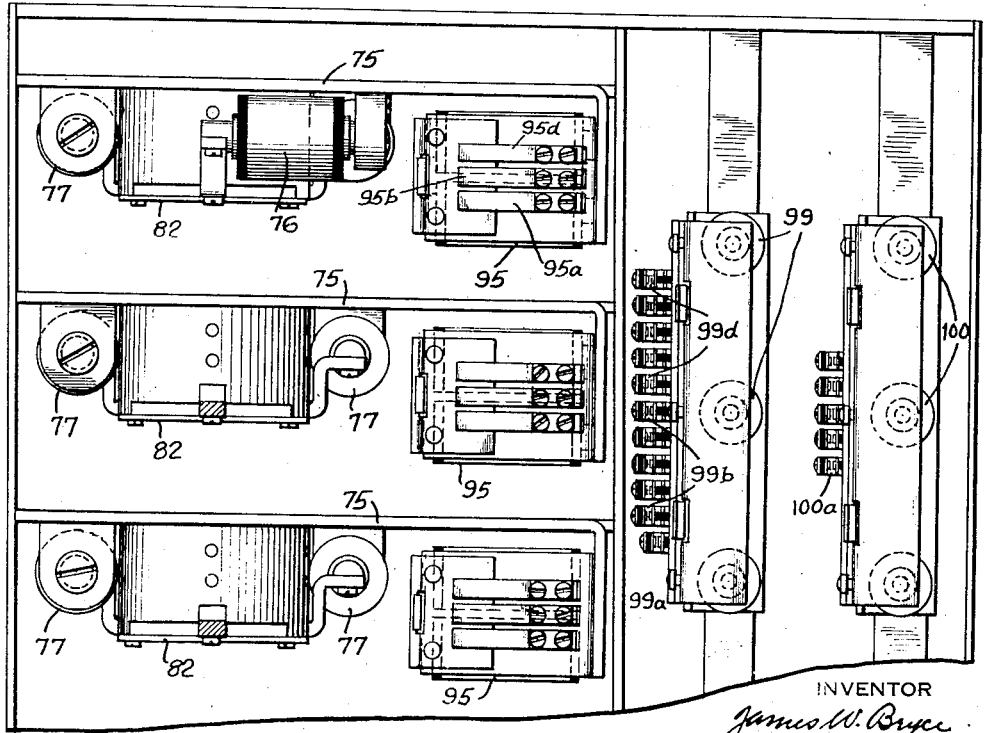
Fig. 8 is a plan elevation partly in section of a number of denominational orders of the accumulator mechanism.

The mechanism for each unit is mounted upon a supporting plate 75 (Figs. 7, 8 and 9). Supported upon the plate 75 are pairs of magnets 76 and 77 whose pole pieces 78 are arranged circumferentially about an arbor 79 as shown in Figs. 7 and 10. Secured to arbor 79 and lying in the plane of the pole pieces 78 is a toothed rotor 80 provided with ten teeth 81 of like configuration. The relationship of the parts is such that when two diametrically opposed teeth 81 of rotor 80 lie on the common center line of one pair of pole pieces 78, the common center line of the other pair of pole pieces 78 will lie across the space between the pairs of teeth 81 immediately adjacent the other pair of pole pieces 78. This arrangement is illustrated at an enlarged scale in Fig. 10 and the operation is such that if a magnetic field is established between the pair of pole pieces lying in the vertical plane, the rotor will be advanced a half tooth space to centralize the rotor in the field. If now a magnetic field is established between the pole pieces lying in the horizontal plane and the first field is dissipated, rotor 81 will advance another half tooth or one-twentieth of a revolution. In this manner, successive, alternate energization of the pairs of magnets 76 and 77 will cause a progressive step-by-step advance of the rotor and the rate of advance will depend upon the rapidity with which the magnetic fields are alternated.

Referring to Fig. 9, arbor 79 is mounted for rotation in the forward bracket 82 and a rear bearing 83. Immediately adjacent to the latter bearing is provided a device for preventing retrograde movement of the rotor which comprises a plurality of balls 84 (see also Fig. 13) which are disposed between a groove in arbor 79 and cam surfaces 85 arranged in the bearing block 83. Springs 86 normally urge the balls in the direction indicated in Fig. 13 and serve to prevent clockwise rotation of the arbor 79 as viewed in this figure.

In operation a magnetic field is normally established between the horizontal pole pieces 78 and tends to hold the rotor in the position shown in dotted outline in Fig. 10. The rotor serves as an accumulating element and each tenth of a revolution constitutes an entry of "1". Thus, if a "1" is to be entered, the normally effective horizontal magnetic field is dissipated and the vertical field established to advance the rotor a twentieth of a revolution. The field then reverts to its original horizontal direction advancing the rotor another twentieth of a revolution. The inertia of rotor 80 will cause an overthrow represented by the difference between its full and dotted line positions. This overthrow will bring the rotor into the next magnetic field for continued advance in the same direction, and if the next field is not established, the spring pressed balls 84 of Fig. 13 will prevent return of the rotor from its advanced position. Thus, to enter one unit, the rotor is advanced one tooth from its initial dotted line position where it is held by the horizontal magnetic field tending to draw it clockwise. To enter a "6", the direction of the field is changed twelve times to effect twelve successive steps of movement to the rotor. The manner in which the direction of the field is alternated and the horizontal field maintained to hold the rotor in its new position will be more fully set forth in connection with the description of the circuit diagram. It may be mentioned that the rotor is initially set in its dotted line position, and is held there by frictional contact of the related parts, so that the rotor will advance immediately upon establishment of the vertical field.

The arrangement for advancing an accumulating element in the form of a rotor, such as 80, has been experimentally operated at a rate of speed in excess of 6400 increments of advance per minute.

At this rate, data can be entered into the accumulating element from 200 cards per minute in a positive and efficient manner with the horizontal magnetic field holding the rotor in displaced position and the balls 84 preventing any retrograde movement of the parts.

Carried by arbor 79 (Fig. 11) is a brush 87 which is advanced therewith and which may occupy any of the ten positions in which the rotor may be held. Arranged circumferentially about arbor 79 is a cylinder 88 in which are embedded a plurality of contact segments 89, one for each of the positions which brush 87 may occupy and with which the brush makes contact when in the corresponding positions. Brush 87 and segments 89 are provided for the purpose of taking a reading from the accumulating element during total printing operations of the machine and the manner in which this is effected will be set forth in detail in connection with the circuit diagram.

Also mounted upon arbor 79 and insulated therefrom by means of a sleeve 90 is a pair of electrically connected brushes 91 one of whose functions is to provide an additional carrying impulse to the next higher denominational order when the order with which they are associated passes through zero. In the plane of brushes 91 and embedded in the cylinder 88 are pairs of contact segments 92 and 93, so located that when the rotor 80 is in zero position, the brushes 91 serve to electrically connect the zero segments 92 and when the rotor is in position to represent "9", a similar connection is made between segments 93.

Referring now to Fig. 7, each plate 75 of a unit of the accumulator has mounted thereon four relay magnets 95, 96, 97, and 98, whose functions will appear in the description of the circuit diagram. For convenience in the present embodiment, the accumulating units are arranged in banks of five, as indicated in Fig. 1, each bank comprising a complete accumulator of five denominational orders. A common casing surrounds each group of five orders as shown in Figs. 7 and 8 and in the casing are mounted five multi-contact relays 99, 100, 101, 102, and 103, which control contacts associated with the five accumulator units of a particular group.

Miscellaneous contact devices

Figure 2:
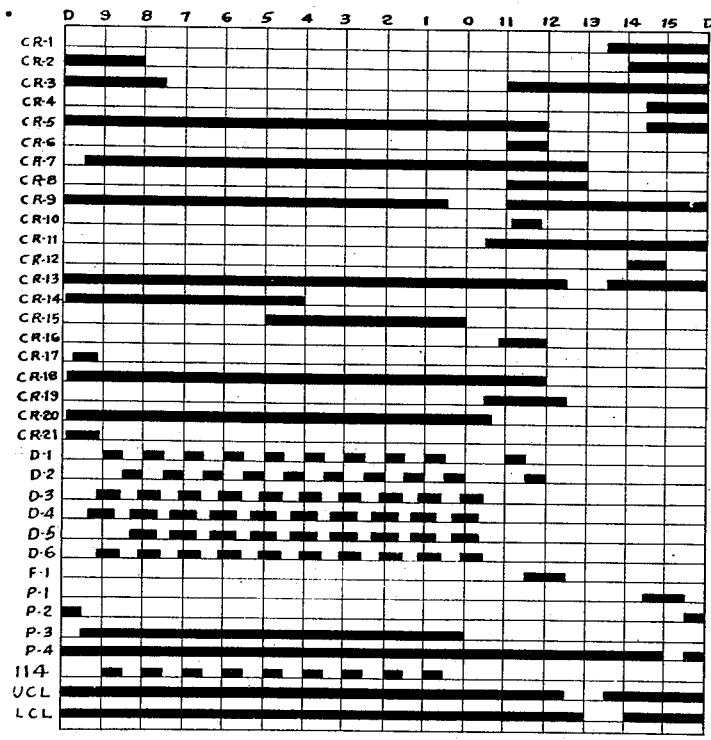
Fig. 2 is a time chart of the timing of the electrical devices of the machine.

Referring to Figs. 1 and 4, shaft 11 carries a gear 104 which, through an idler 105, drives a gear 106 mounted upon a shaft 107 which in turn, through gears 108, drives a shaft 109. Upon shafts 107 and 109 are mounted the various cam controlled contact devices prefixed "CR" in the drawings and impulse distributors whose function will be described in connection with the circuit diagram and whose timing is illustrated in the timing diagram in Fig. 2. This and other contact devices are designated in Fig. 2 to show their relative timing, the dark stripes representing the period in the cycle when the contacts are closed. A gear 110 secured to shaft 107 drives a gear 111 mounted upon a shaft 112 which in turn carries a pair of electrically connected brushes 113 insulated from the shaft. The brushes 113 serve to connect insulated contact segments 114 successively with a common arcuate conducting sector 115. By virtue of the gear connection just described, shafts 107, 109 and 112 are rotatable constantly as long as the motor M is in operation.

In Figs. 1 and 4, shaft 15 is provided with cam contact devices which, since shaft 15 is in operation only during card feeding operations, operate the contact devices only at such times. These devices are prefixed "F" in the drawings.

Figure 3A:
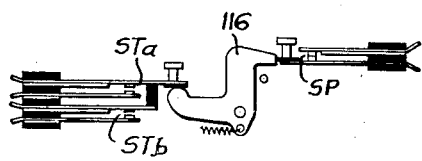
Fig. 3a is a detail of the start and stop keys.

In Fig. 5, shaft 25 also carries contact controlling cams which function only when the shaft 25 is in operation for listing and total printing purposes. These cam contacts are prefixed "P" in the drawings. In Fig. 3, a pair of contacts UCL are provided and a similar pair of contacts LCL which are closed by the usual card levers as the record cards R pass the upper and lower brush stations respectively. In Fig. 3a is shown the start and stop key construction in which the key to the left is the start key, which upon depression will close contacts STa and STb. The stop key, upon operation, will open contacts Sp and will at the same time be latched in open position by a spring-pressed pivoted latch 116. Contacts Sp will be held open thereby until a subsequent operation of the start key which will permit the stop key contacts to close at the time the start key contacts are closed.

*Circuit diagram*

The circuit diagram (Figs. 14 and 14a) will now be explained in detail and the coordination of the various units will be explained in connection therewith. Current is supplied to main lines 120 and 121 from a suitable source S on closure of main line switch 122. Immediately upon closure of switch 122 current will flow from source S to wire 123, motor M, wire 124, line 120, to source S. This will result in the operation of the shafts 107, 109 and 112 in Fig. 4 and the various cam controlled contact devices will operate.

In order to make the circuit diagram more readily understandable, the circuit connections of the accumulator itself are confined to Fig. 14a and the controlling circuits of the machine proper which include the analyzing and printing circuits are shown on Fig. 14. The connections shown by short dotted lines between the figures indicates that the accumulator may be electrically connected to the main part of the machine and these individual connections may be gathered into a single cable.

Various relays and associated contacts are shown on both figures of the circuit diagram. For better identification, the contacts operated by the relays are designated with the same reference numeral as the related relay, followed by a lower case letter.

*Plugging connections.*—Before placing the machine in operation, plug wire connections are made as follows: A plug connection 125 (Fig. 14) is made between each lower brush socket of columns of a card whose data it is desired to list, and a plug socket 126. This connection selects a particular print magnet 64 for recording the data in the selected column.

Where data are to be accumulated a plug connection 127 is made from each column to a plug socket 128 (Fig. 14a) which is associated with one of the denominational orders of the accumulator. The circuits through these connections will be traced later. Further connections, as 129 (Fig. 14) are made between plug sockets 130 of the accumulator read-out mechanism and sockets 131 to direct the reading out of totals from the accumulator to certain selected print magnets 64.

With the cards placed in the supply magazine the machine is ready to commence feeding of cards. Depression of the start key at this time will close its contacts STa (Fig. 14) and a circuit will be completed from source S, line 120, wire 124, contacts STa, contacts CR1, contacts P2, contacts 132a of relay magnet 132, magnet 135, wire 133, contacts 134b of relay magnet 134, wire 123 to source S. Energization of relay magnet 135 will close its points 135a and 135b, the former of which provide a holding circuit for the magnet, traceable from wire 123, relay contacts 134b, wire 133, magnet 135, contacts 135a, stop key contacts SP, contacts CR3, wire 124, to line 120. Closure of contacts 135b completes the circuit through the card feeding clutch magnet 20 from wire 123, magnet 20, contacts 135b, wire 136, contacts CR2, wire 124, to line 120.

With the card feed clutch engaged, the first card will feed downwardly past the upper brushes and cause closure of card lever contacts UCL which immediately complete a circuit from line 121, contacts UCL, relay magnet 137, wire 124, to line 120. Magnet 137 will close its contacts 137a through which current is supplied to the upper brush contact roller. Magnet 137 will also close its contacts 137c which short circuit the cam contacts CR3 and maintain the circuit between the stop key contacts SP and wire 124 as long as cards are passing the upper brushes.

As the card feeds downwardly past the lower brushes, the lower card lever contacts LCL are closed, completing a circuit from wire 123, contacts LCL, relay magnet 138, wire 124, to line 120. Magnet 138 closes its contacts 138a, 138b, 138c, 138f and 138g and opens its contacts 138d and 138e which perform various controlling functions as will be pointed out hereinafter. Contacts 138b control the supply of current to the common contact roller of the lower brushes.

If the machine is to list, switch 139 is closed and the print clutch magnet 31 will have been energized concurrently with the card feed clutch magnet 20, the circuit being traced from wire 123, magnet 31, contacts 134d, contacts 138f, switch 139, contacts 135b, wire 136, contacts CR2, wire 124, to line 120. In this manner the printing mechanism operates in unison with the card feeding so that as cards feed downwardly past the lower brushes, circuits will be completed for listing and accumulating.

*Listing circuit.*—A representative listing circuit may be traced as follows: from line 120, wire 124, brushes 140 of impulse distributor D3, wire 141, contacts 138b now closed, lower brush contact roller, perforation in the record card, lower brush LB, lower brush plug socket 125a, plug connection 125, socket 126, normally closed contacts 142a, selected print magnet 64, contacts P3, closed while the card is passing the lower brushes, to line 121. As usual, the timed energization of magnet 64 will interrupt the movement of the type bar to present the character corresponding to the location of the perforation to the printing platen.

*Adding circuit.*—A representative adding circuit will now be traced. This circuit is the same as that traced for listing except that at the lower brush plug socket 125a it runs through the plug connection 127 to socket 128 (Fig. 14a) and thence through wire 343 through contacts 101a of the denominational order associated with the connected socket 128, contacts 99c, relay magnet 95, wire 143 (see also Fig. 14), contacts 138g (now closed under control of the lower card lever contacts), wire 144, wire 123, to source S.

The effect of the completion of this circuit is to energize relay magnet 95 and shift its contacts from the position shown in Fig. 14a. The contacts 95d control the holding circuit for the accumulating mechanism to maintain the accumulating element in position. This circuit is established immediately upon closure of the main line switch 122 (Fig. 14) and is traceable from source S, line 121, wire 145 (Fig. 14a), contacts 95d, magnets 77 in all orders, line 120, back to source S.

As explained above, energization of magnets 77 establishes the horizontal magnetic field and the maintenance of this field through the circuit just traced will hold the accumulating element in position. However, upon energization of relay magnet 95 under control of a perforation in a record column, this holding circuit will be broken and magnets 76 and 77 will be connected to a pair of impulse distributors or emitters D1 and D2 (Fig. 14) which are adapted to emit a series of alternating impulses any or all of which may be impressed upon the magnets 76 and 77 under control of the relay magnet 95. Impulse distributor D1 will first complete a circuit from line 121 (Fig. 14), distributor D1, wire 146 (Fig. 14), contacts 95b, magnets 76 to line 120. This impulse, as explained above, will advance the accumulating element a twentieth of a revolution. Immediately thereafter impulse distributor D2 will complete a circuit from line 121 (Fig. 14), distributor D2, wire 147 (Fig. 14a), contacts 95c, magnets 77 to line 120. The circuit through magnets 76 is broken at the same time so that the accumulating element is now advanced another twentieth of a revolution and a full step of movement is recorded. In this manner the distributors D1 and D2 alternate in their control of the pairs of magnets 76 and 77 to effect the step-by-step advance of the accumulating element.

Reference to the timing diagram (Fig. 2) will show the timing of the impulses emitted by the distributors D1 and D2 and it will be apparent that if magnet 95 is energized under control of a perforation in the "9" index point position of the record card that the distributors will each emit nine impulses to advance the accumulating element nine steps, while if the relay magnet 95 is energized under control of a perforation in the "5" index point position that only the five impulses of each of the distributors subsequent to the "5" point in the cycle of the machine will be effective for actuation of the accumulating element.

Since the initial energizing circuit of magnet 95 is momentary, it is necessary to provide a holding circuit therefor. Contacts CR14 and CR15 (Fig. 14) are closed during the reading portion of the machine cycle and serve to complete a circuit from line 120, wire 148, contacts CR14 and CR15 to wire 149 (Fig. 14a), contacts 99e, contacts 95a, magnet 95, wire 143 (Fig. 14), contacts 138g, wire 144, wire 123, to line 121. Magnet 95 having been energized at a differential time during the cycle will be kept energized for the remainder of the entering portion of the cycle to permit the transmission of the necessary entering impulses. After an entry has been made in the accumulating element, magnet 95 will become deenergized and the initial holding circuit through contacts 95d will again be completed to hold the accumulating element in its displaced position until magnet 95 is again energized during a subsequent cycle.

In this manner, items read from the successively fed record cards as they move in transit past the lower brushes LB may be printed or added, or both and this listing and accumulating will continue until the supply of cards is exhausted or until the automatic control mechanism, which is yet to be explained, causes interruption in machine operation for the purpose of permitting total printing operations to take place.

*Carrying.*—In different denominational orders in which entries have been made which aggregate ten or more, the contact brushes 91 (Fig. 14a) will have passed or will rest upon the zero contact segments 92 of the cylinder 88 at the end of the entering portion of the cycle. Assuming that the brushes 91 in the hundreds order in Fig. 14a pass through "9" during the entering portion of the cycle, at the time of passing a circuit will be completed as follows: from line 121 (Fig. 14), impulse distributor D4, wire 150 (Fig. 14a), normally closed relay contacts 103a, wire 151, "9" segment 93 in the hundreds order, brushes 91 in dotted position, second "9" segment 93, coil of double wound relay 98, wire 152, to line 120. This circuit is completed during the entering portion of the cycle whenever the accumulating element is on or reaches the "9" position. Energization of coil 98 will attract and close its contacts 98a, 98b and 98c of which contacts 98a provide a holding circuit for the magnet, which is traceable from line 121 (Fig. 14), wire 145 (Fig. 14a), wire 153, right hand winding of magnet 98, contacts 98a, wire 154, wire 155, wire 156 (Fig. 14), constantly running cam contacts CR18, wire 148, to line 120. Contacts CR18 remain closed throughout the entering portion of the cycle until the carrying operations have been completed when they open to drop the holding circuit.

If the brush 91 makes contact between the zero segments 92 after having passed the "9" segments 93 and establish the circuits just traced, further circuits will be set up which may be traced from line 121 (Fig. 14), impulse distributor D5, wire 356, relay contacts 98b of the hundreds order, for example (now closed), zero segments 92 and brushes 91 of such order, left hand coil of magnet 97, wire 152, to line 120. Magnet 97 will close its contacts 97a, 97b and will open contacts 97c and 97d. Contacts 97a will set up a holding circuit for the relay magnet traceable from line 121 (Fig. 14), wire 145 (Fig. 14a), wire 153, right hand winding of magnet 97, contacts 97a, wires 154, 155, and 156, cam contacts CR18, wire 148 to line 120. From the foregoing it will be apparent that whenever the accumulating element is in "9" position, relay magnet 98 will be energized and a holding circuit established therefor and whenever the accumulating element passes through zero, relay magnet 97 will also be energized and a holding circuit provided therefor.

Let it be assumed that the accumulating element of the hundreds order in Fig. 14a has successively passed through "9" and "0" during the entering portion of a cycle so that the associated magnets 98 and 97 are energized. During the carrying part of the cycle then, cam contacts CR19 close to complete a carrying circuit from line 121 (Fig. 14), cam contacts CR19, wire 157 (Fig. 14a), transfer relay magnet 101, wire 152, to line 120. Energization of magnet 101 will cause opening of its contacts 101a and closure of its contacts 101b.

Following the closure of contacts CR19, closure of contacts CR16 will establish the transfer circuits as follows: from line 120 (Fig. 14), wire 148, contacts CR16, wire 158 (Fig. 14a), contacts 97b in the hundreds order, transfer connection wire 159, which may be a plug wire connection if desired; contacts 101b of the thousands order, contacts 99c, and magnet 95 also of the thousands order; wire 143 (Fig. 14), card lever relay contacts 138g, wires 144, 123, to line 121.

As before, energization of relay magnet 95 will shift its contacts to connect the magnets 76 and 77 of the thousands order with the alternating distributors D1 and D2 which each emit a single impulse to the magnets 76 and 77 to cause advance of the accumulating element a single step. It will, of course, be obvious that parallel carrying circuits will be completed through all denominational orders whose accumulating elements pass through zero during the entering portion of the cycle and additional units will be thereby added to the next higher orders.

Provision is made so that if the denominational order receiving the carry is standing at "9" during the carry operation, additional circuits will automatically be completed to also add "1" to the next higher order. The operation of these circuits may best be illustrated by assuming that a carry is to take place from the tens order in Fig. 14a to the hundreds order and that the hundreds order is standing at "9" in which case its relay magnet 98 will be energized as explained above. The carry circuit just traced, which extends through connection 159 between the hundreds and tens orders, will continue through contacts 101b of the hundreds order to energize the relay magnet 95 as before so that an additional "1" will be entered in the hundreds order.

A branch circuit, however, will continue from contacts 101b of the hundreds order, through wire 160, contacts 98c of the hundreds order, contacts 97c (now closed), connection 159 between the hundreds and thousands orders, contacts 101b of the thousands order, contacts 99c, magnet 95 of the thousands order, wire 143, back to line 121 as before.

Subtracting

As is general in the tabulating art, record cards whose data are to be subtractively entered into accumulating mechanism are identified with a special perforation usually made in the so-called "X" index point position of a selected column of the record card. This perforation is analyzed by the upper brushes and a circuit completed therethrough conditions the machine for subtracting. A plug connection 161 (Fig. 14) is made between the plug socket of the brush UB of the column in which the "X" perforation is found, and a special plug socket 162, so that upon analysis of the "X" perforation by the upper brush, a circuit will be completed from the upper brush common roller, through the perforation, connection 161, socket 162, a pair of cam contacts CR10 which close during the analysis of the "X" perforation of the card, relay magnet 163, wire 124, to line 120. Magnet 163 will close its contacts 163a and a circuit will be completed through relay magnet 164 which is connected between lines 121 and 120 as shown. Magnet 164 in turn closes its contacts 164a to establish a holding circuit for the magnet 164 which is traceable from line 120, wire 124, contacts CR11, contacts 164a, magnet 164, wire 123, to line 121. Contacts CR11 remain closed until the end of the cycle, thus maintaining magnet 164 energized for the same period.

After the holding circuit has been established, cam contacts CR12 close to complete a branch circuit from contacts 164a, contacts CR12, relay magnet 165, wire 123, to line 121. Magnet 165 closes its contacts 165a, 165b and 165c. Contacts 165a close to complete a holding circuit for magnet 165 traceable from line 120, wire 124, contacts CR13, contacts 165a, magnet 165, to line 121. Contacts CR13 remain closed throughout the entering and carrying portion of the next cycle which is the cycle during which the same card is passing the lower brushes and from which the data are to be subtractively entered into the accumulating devices.

Closure of contacts 165c will complete a circuit from line 121, wire 123, wire 166, contacts 165c, wire 167 (Fig. 14a), magnet 102, wire 156 (Fig. 14), contacts CR18, wire 148 to line 120. This circuit is completed at the beginning of the cycle during which the card passes the lower brushes and will remain completed throughout the entering and carrying portions of the cycle. Energization of magnet 102 will close its contacts 102a, 102b and will open its contacts 102c for the purpose of controlling circuits to be traced presently. Contacts 165b (Fig. 14) control a circuit from line 121, wire 123, wire 166, contacts 165b, wire 168, contacts CR20, wire 169 (Fig. 14a), magnet 99, wire 152, to line 120. Contacts CR20 remain closed throughout the entering portion of the cycle and magnet 99 will consequently remain energized for that period and will maintain its contacts 99a, 99b, 99d closed and its contacts 99c and 99e open.

Contacts 165b (Fig. 14) control a further circuit traceable from line 121, wire 123, wire 166, contacts 165b, wire 168, contacts CR21, timed to close just before the "9" point in the machine cycle, wire 170 (Fig. 14a), relay magnet 100, wire 152, to line 120 and this momentary energization of magnet 100 will close its contacts 100a and a circuit will be completed from line 120, wire 148, contacts CR17 (which close momentarily while magnet 100 is energized), wire 171, contacts 100a, contacts 99b (now closed), magnet 95, wire 143, back to line 121 as before. The energization of magnet 95, as before, shifts its contacts so that impulse distributors D1 and D2 emit alternate impulses to the accumulator operating magnets 76 and 77.

In this fashion the accumulating elements of all orders are concurrently advanced and will continue advancing step by step until the perforation in the record card is sensed by the lower brushes. At such time, a circuit will be completed through the corresponding order which will interrupt further advance of the accumulating element, the net result being that the element will have advanced an amount corresponding to the nines complementary value of the perforation and will, in effect, subtract the amount perforated in the card from the amount already standing on the accumulator. The holding circuit for magnet 95 is traceable during subtracting operations as follows: from line 121 (Fig. 14), wire 123, wire 144, contacts 138g, wire 143 (Fig. 14a), magnet 95, contacts 95a, contacts 99d (now closed), contacts 102b (now closed), contacts 96b, wire 173, wire 174, wire 149 (Fig. 14), contacts CR14, CR15, wire 148 to line 120. It is the breaking of this holding circuit which interrupts the step-by-step advance of the accumulating element.

The operation may best be explained in connection with a concrete example. Assuming the perforation analyzed to be a "6", the accumulating operation will accordingly be interrupted after three steps of movement have been effected under control of the distributors D1 and D2 and this will occur at the "6" point in the cycle of operations. The circuit through the lower brushes will follow from line 120, as for adding, through the brushes and plug connection 127 to socket 128 (Fig. 14a), thence through wire 143, contacts 102a (now closed), magnet 96, wire 172, wire 153, wire 145 (Fig. 14), to line 121. Energization of relay magnet 96 will open contacts 96b to interrupt the holding circuit of the magnet 95 and further advance of the corresponding accumulator order will cease. Contacts 96a close to maintain the holding circuit interrupted through a holding circuit traceable from line 121 (Fig. 14a), wire 145, wire 153, wire 172, magnet 96, contacts 96a, wire 156, contacts CR18, wire 148, to line 120.

*Elusive one.*—Magnet 102 when energized also closes an additional contact 102d (Fig. 14a) which controls the entering of the elusive one into the units order of the accumulator to complement the value entered in that order to ten. During the carry portion of the cycle a circuit is completed from line 120 (Fig. 14), wire 148, contacts CR16, wire 158 (Fig. 14a), contacts 102d, connection 175, which may be inserted between contacts 102d and any order selected as the units order of the accumulator, contacts 101b of the units order, contacts 99c, magnet 95, to line 121, as before. Energization of magnet 95 at this time will cause the addition of "1" to the units order in the manner explained above.

*Group control mechanism*

The machine is provided with so-called group control mechanism which keeps it in operation as long as classification data on successively fed cards remains unchanged. The method of group controlling is well known in the use of tabulating machines and will therefore be but briefly described. Plug connections 176 (Fig. 14) are made between the sockets of upper brushes UB which read the columns of the card in which the classification or group number is perforated and plug sockets 177. Plug connections 178 are made between the corresponding sockets at the lower brushes LB and plug sockets 179. With this arrangement, as the cards successively pass the upper and lower brushes, circuits will be completed through the like perforations in the several columns to cause energization of the windings of magnets 180. This causes closure of contacts 180a which under control of cam contacts CR7 provide a holding circuit for the magnet 180 by energizing the lower coil thereof. The second pairs of contacts 180b of magnet 180 are connected in series formation and as long as there is agreement between the cards compared, all the selected contacts 180b will close during each cycle. Following the entering and analyzing portion of each cycle, cam contacts CR8 close momentarily to test the series circuit which, if the cards are in agreement, will be completed as follows: From line 120, wire 124, relay magnet 181, wire 182, contacts CR8, series contacts 180b, shunt connection 183 which shunts out those columns of the control not being used, to line 121. If at the time contacts CR8 close one or more of the contacts 180b are open, this circuit will not be completed and contacts 181a of magnet 181 will therefore be closed.

Shortly after the closing of contacts CR7, a pair of contacts F1 close and will complete a circuit, under conditions of disagreement, which is traceable from line 120, wire 124, contacts F1, contacts 181a, contacts 138a, magnet 134, wire 123, to line 121. Contacts 134a provide a holding circuit for magnet 134 traceable from line 121, wire 123, magnet 134, contacts 134a, contacts CR9, switch 183, wire 124, to line 120. Contacts CR9 remain closed throughout the next succeeding cycle and magnet 134 will therefore remain energized for the same period and will open its contacts 134b, 134d, and will close its contacts 134c and 134e. Opening of contacts 134b causes deenergization of magnet 135. Magnet 135 will thereupon open its contacts 135b and the card feed clutch magnet 20 and print clutch magnet 31 will become deenergized and card feeding will cease. Closure of contacts 134c will permit reenergization of the printing clutch magnet 31 toward the end of the cycle under control of contacts CR2 so that during the next cycle the printing mechanism will operate without accompaniment by the card feeding mechanism. Contacts 134e supply current to the total printing emitter so that the amounts standing in the accumulator may be read therefrom and printed during this cycle.

*Total printing*

At this time, the brushes 87 associated with the several denominational orders (Fig. 14a) will occupy positions corresponding to the setting of their respective orders and will contact with corresponding segments 89. As the contact brushes 113 (Fig. 14) successively connect the segments 114 with common segment 115, impulses will be successively impressed upon the wires 184 and circuits will be completed through the read-out commutators of the several orders at differential times depending upon the setting of the brushes 87.

A representative circuit is traceable as follows: from line 120 (Fig. 14), wire 124, contacts 134e, wire 185, common 115, brushes 113, wires 184 in succession (Fig. 14a), one of the segments 89, brush 87, wire 186, connection 129 (Fig. 14), plug socket 131, contacts 142b (now closed), print magnet 64, contacts P3, to line 121. Contacts 142b are closed during total printing operations under control of magnet 142 which is energized for such period by means of a circuit traceable from magnet 142, wire 187, contacts 134a, contacts CR9, wire 124, to line 120. In this manner a reading is taken from each of the denominational orders of the accumulator. It will be observed that the reading is taken from the accumulator orders without movement of the parts of the accumulator so that after total printing has taken place, the accumulator is positioned as at the beginning of the total printing operations.

Resetting

Resetting takes place during the cycle following total printing and is brought about as follows: Toward the end of the print cycle after contacts CR9 have opened to deenergize magnet 134 so that contacts 134b are closed, the closure of contacts P1 will complete a circuit from line 120, wire 124, contacts P1 normally closed relay contacts 190c, card feed clutch magnet contacts 20a (now closed), magnet 132, contacts 134b, wire 123, to line 121. Magnet 132 will operate its related contacts of which contacts 132c provide a holding circuit for the magnet from line 121, wire 123, contacts 134b, magnet 132, contacts 132c, contacts CR5, wire 124, to line 120. Contacts CR5 maintain the circuit throughout the resetting operations. Contacts 132e upon closure complete a circuit from line 121, wire 123, contacts 132e, wire 168, contacts CR21, wire 170 (Fig. 14a), magnet 100, to line 120.

The parallel circuit through contacts CR20 will be completed at the same time continuing from wire 168 (Fig. 14), contacts CR20, wire 169 (Fig. 14a), magnet 99, to wire 120. As before, the concurrent energization of magnets 100 and 99 will cause the completion of a circuit through magnet 95 which will now be completed as follows: from line 120 (Fig. 14), wire 148, contacts CR17, wire 171 (Fig. 14a) contacts 100a, contacts 99b, magnet 95, wire 143 (Fig. 14), contacts 132d, wire 123, to line 121. Energization of magnet 95 as before will connect the impulse distributors D1 and D2 to the entering devices of the accumulator units and the distributors will emit alternate impulses to the units. The number of impulses which the units will receive will be the amount necessary to advance the units to zero position at which time magnet 95 will be deenergized. This is effected in the following manner: The holding circuit for magnets 95 are individually traceable from line 121 (Fig. 14), wire 123, contacts 132d, wire 143 (Fig. 14a), magnet 95, contacts 95a, contacts 99d, contacts 102c, contacts 97d, closed if the unit is not standing in zero position, wire 174, wire 149 (Fig. 14), contacts CR14, CR15 to line 120. It will, of course, be apparent that if the accumulator element is standing at zero, the contacts 97d will be open and there will be no holding circuit for magnet 95 and it will immediately deenergize so that no impulses from the distributors D1 and D2 can be transmitted to that particular unit and the unit will remain in zero position. The previous closure of contacts 132f (Fig. 14) completed a circuit from line 121, wire 123, contacts 132f, wire 191 (Fig. 14a), magnet 103, wire 155, wire 156, contacts CR18, wire 148 to line 120.

Magnet 103 opened its contacts 103a and closed contacts 103b and also closed a pair of contacts 103c which control the holding circuit for the magnet 99. With the various circuits completed as just described, the several units will receive impulses from the distributors D1 and D2 and the holding circuits of the magnets 95 are controlled through contacts 97d of the relay magnets 97. As the accumulating element of each order arrives at zero position so that its brushes 91 bridge the segments 92, a circuit will immediately be completed as follows: from line 121 (Fig. 14), impulse distributor D6, wire 192 (Fig. 14a), contacts 103b, segments 92, brushes 91, left hand winding of magnet 97, wire 152, to line 120. Energization of magnet 97 will immediately open its contacts 97d, deenergizing magnet 95 and interrupting the transmission of further impulses to the unit which will therefore remain in zero position. The holding circuit for magnet 97 will be established as before. In this manner the co-operation of brushes 91 with segments 92 serves the double purpose of preparing transfer circuits during item entering operations of the machine and for controlling the resetting or zeroizing of the accumulating units during resetting operations.

Restarting

The card feeding and item entering operations of the machine are automatically resumed after the resetting operations are completed, in the following manner.

Cam contacts CR6 close momentarily toward the end of the resetting cycle and complete a circuit from line 120, wire 124, contacts CR6, contacts 132b (now closed), magnet 135, wire 133, contacts 134b, wire 123, to line 121. Magnet 135 will close contacts 135b which will energize the card feed clutch magnet circuit and a cycle of operation of the card feed mechanism will take place and will continue as long as group number designations on the succeeding cards are the same.

Progressive total printing

Whenever it is desired to have the machine perform total printing operations without accompanying resetting of the accumulators, the switch 183 (Fig. 14) is moved to its dotted line position and upon the detection by the group control mechanism of a disagreement between successively fed cards, total printing will take place as described above but the resetting cycle of operations will be eliminated. Card feeding and analyzing will resume immediately after the total has been printed under control of the accumulators and the data derived from the succeeding group of cards will be added to that already standing in the accumulators. The circuits involved in bringing these conditions about will now be described. Upon a disagreement in the group numbers of successive record cards, the relay magnet 181 will become deenergized as before and the circuit through relay magnet 134 will also be completed in the same manner. Closure of contacts 134a will now complete a circuit from line 121, wire 123, magnet 190, switch 183, contacts CR9, contact 134a, contacts 138a, 181a, and F1, wire 124, to line 120.

The holding circuit for magnet 134 is traceable from line 121, wire 123, magnet 134, contacts 134a, CR9, switch 183, contacts 190a, contacts P4, wire 124, to line 120. Magnet 190 will be held through a parallel circuit from line 121, wire 123, magnet 190, contacts 190a, contacts P4, wire 124, to line 120.

As before, energization of magnet 134 will interrupt further card feeding operations and initiate a cycle of operations of the printing mechanism during which the total standing on the accumulator will be printed as before. Toward the end of the printing cycle cam contacts P1 close and a circuit is established from line 120, wire 124, contacts P1, contacts 190b (now closed), contacts 138c (also closed), relay magnet 135, wire 133, contacts 134b, wire 123, to line 121. Contacts 134b closed due to the deenergization of magnet 134 upon opening of contacts CR9 earlier in the cycle. In this manner magnet 135 is energized near the end of the total printing cycle and will accordingly close its contacts 135b to again energize the card feed clutch magnet

20 so that card feeding operations may take place on the next succeeding cycle.

*Last card operation.*—Provision is made for automatically resetting the accumulators under progressive total printing conditions after the last card has been analyzed. This is brought about by energization of magnet 132 during the last total printing cycle, when contacts P1 will complete a circuit from line 120, wire 124, contacts P1, contacts 190b, contacts 138d (now closed, since there is no card at the lower brush station), magnet 132, contacts 134b, wire 123, to line 121.

Magnet 132, as before, sets up its holding circuit through contacts 132c and CR5 and through its several other contacts, conditions the circuits for resetting operations. Following this last resetting operation, an additional cycle of operations of the card feeding mechanism is initiated as explained above, during which the last card is advanced from beyond the lower brushes to the stacker.

Recapitulation

A brief résumé will now be given of the entire operation of the machine to point out the sequence in which the various operations take place. Depression of the start key will first cause the machine to perform a resetting cycle of operations to insure that the accumulators are clear and in readiness to receive entries. This resetting cycle is brought about upon closure of start key contacts STb which complete a circuit from line 120, wire 124, contacts STb, contacts CR4, contacts 138e (closed since no cards are at either brush station), magnet 132, wire 133, contacts 134b, wire 123, to line 121. Magnet 132 in the now familiar manner, causes a resetting cycle of operations to take place. The closure of contacts STa, concurrently with contacts STb will initiate a card feeding cycle of operations in the manner explained above so that a card is fed from the hopper 32 to the upper brushes while resetting of the accumulators takes place. Following this operation, magnet 135 will again become energized upon closure of contacts CR6 and its contacts in turn cause energization of the card feed clutch magnet 20. If the machine is set for listing with switch 139 closed, print clutch magnet 31 will also become energized after the first card has arrived at the lower brush station.

From this point on, entries will be made into the accumulator orders and to the printing mechanism from the successive cards, and the group control mechanism will keep the machine in operation as long as the group control numbers on the successive cards remain the same. The cards whose perforations represent positive values will be directly entered into the accumulators. Those whose entries represent negative items will be entered into the accumulators in their complementary value.

Upon a change in group number, card feeding will be interrupted and a total printing cycle of operations will take place during which the amount standing on the accumulator will be printed. If the machine is conditioned for progressive total printing, card feeding operations will then resume and further entries made into the accumulators. If the machine is not set for progressive total printing, a resetting cycle of operations will follow after the total printing cycle, during which the accumulators will be cleared or zeroized and card feeding operations will be resumed after this resetting cycle. After the supply of cards has been exhausted, the machine will automatically print the total standing in the accumulators at that time and then automatically zeroize them.

Modification

In Fig. 15 is shown a view of a modified form of the invention in which a keyboard is provided for effecting entries into the accumulators and in which printing mechanism similar to that in the main form of the invention is also provided for item and total printing purposes. The accumulating mechanism of the modification is entirely similar to that of the main form. The modification is also arranged so that total printing and resetting take place in the same cycle of operations and for the sake of simplicity, the subtracting features have been omitted.

A multi-columnar keyboard is provided with a plurality of columns of keys 200, a motor bar 201 (Fig. 17), sub-total key 202, grand total key 203, and a list, non-list lever 204. Keys 200 are adapted to cooperate with the usual spring-pressed latching bar 205 which serves to hold the depressed keys in their lowered positions until the bars 205 are moved toward the left under control of a releasing magnet 206. The lower end of each key 200 carries a contacting strip 207 insulated from the key and adapted to complete a connection between a denominational order conductor 208 and a digit position conductor 209 so that depression of any key, for example the "5" key 200, will make an electrical connection between the bar 208 in which column the key is depressed and the "5" bar 209. The keys 202 and 203 (Fig. 17) are also provided with a latching bar 205a also operated to unlatch the keys under control of the magnet 206. The printing mechanism is driven in the same manner as that in the preferred form, through mechanism controlled by the main operating shaft 210 of the printing mechanism which has loosely mounted thereon a clutch driving member 211 integral with the gear 212 driven from a gear 213 on shaft 214 which in turn is driven from the motor M. Energization of the magnet 215 will operate a one revolution clutch mechanism, generally designated 216, to couple shaft 210 to clutch driving element 211 for one cycle of operation, during which the type bars will rise to print the amount set up on the keyboard. The shaft 214 carries a number of cam controlled contact devices which will hereinafter be designated with either the prefix CR or M and these operate at all times.

The operation of the modification may best be explained in connection with the circuit diagram, Fig. 18. In the diagram, those elements which are similar to elements performing the same functions in the main form will be identified by similar reference numerals for convenience. Closure of switch 122 will place the motor M in operation and the shaft 214 will accordingly rotate constantly. As in the main form, a circuit will also be immedaitely completed through the accumulating magnets 77, through the contacts 95d to hold the accumulating elements in position and contacts 95b and 95c serve to connect the alternating distributors D7 and D8 to magnets 76 and 77 respectively.

Figure 6:
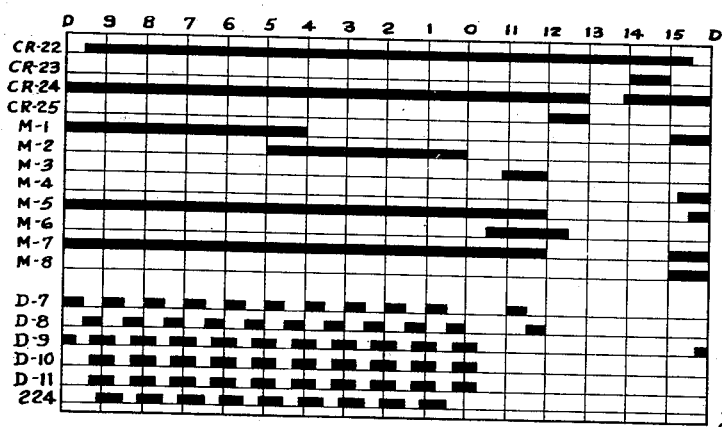
Fig. 6 is a timing diagram of the modified form of the invention.

After an amount has been set up on the keyboard by depression of the corresponding keys, the motor bar 201 is depressed to close contacts 217 and a circuit will be completed from source S, wire 218, contacts 217, relay magnet 250, wire 228, back to source S. Closure of contacts 250a will then hold the circuit through magnet 250 under control of cam contacts CR22 so that upon closure of contacts CR23 a circuit will be completed from source S, wire 218, contacts CR22, 250a, and CR23, relay magnet 219, wire 220, back to source S. Energization of magnet 219 will close its contacts 219a, 219b and 219c. With switch 122 closed, the motor M and shaft 214 as explained are in constant rotation as are the CR cams and the emitters. Thus when the motor bar 201 is operated to close contacts 217, the CR contacts may be in any position with respect to the "D" position of the time diagram, Fig. 6. For this reason contacts CR22 are provided so that if contacts 217 are momentarily closed early in any cycle, the relay 250 will be held energized until after contacts CR23 close near the end of the cycle. Of course, the momentary closure of contacts 217 may coincide with the closure of contacts CR23 in which case, no holding circuit is necessary, or if the operator holds the contacts 217 closed for a period of a cycle the holding circuit can be omitted. Accordingly, upon closure of contacts CR23, near the end of a cycle magnet 219 will be energized and it will close its contacts 219a to establish a holding circuit from line 220, relay 219, contacts 219a, cam contacts CR24, to line 218. Contacts CR24 continue this holding circuit throughout the major part of the next following cycle.

Assuming that the machine is set for accumulating only, closure of contacts 219c will control a circuit traceable from source S, wire 218, contacts 219c, wire 221, common strip 222, brushes 223, driven from shaft 214, and then successively to contact segments 224 which are electrically connected with the diget bars 209.

Assuming the "8" key 200 of the hundreds order to have been depressed, the circuit will continue through the "8" segment 224, "8" bar 209, connector 207, hundreds bar 208, wire 225, contacts 101a in the hundreds order, contacts 99b, magnet 95, to opposite side of source S. As in the preferred form, energization of magnet 95 at a differential time will cause the emitters D7 and D8 to advance the accumulating element an amount proportional to the value of the controlling digit. Similar circuits are traceable through the other orders of the accumulators during the cycle and near the end of a cycle, transferring operations will take place in the same manner as in the preferred form.

Where items are to be subtractively entered, this can be done by manually setting up the tens complement of the number on the keyboard and performing a straight adding operation.

If the machine is to list the entered items as they are accumulated, the list, non-list lever 204 is moved to position to close contacts 226 which will complete a circuit after relay 219 is energized as above, from source S, wire 218, relay magnet 227, wire 228, contacts 226, contacts 229, contacts 230, wire 231, contacts 219b, wire 220, to source S. Magnet 227 will close a plurality of contacts 227a to connect the several denominational order bars 208 to print magnets 64 corresponding to those orders. In addition contacts 227b which close along with contacts 227a, complete a circuit to the print clutch magnet 215 as follows: from source S, wire 220, contacts 219b, contacts 227b, clutch magnet 215, wire 218 to source S.

Concurrently with the completion of the adding circuit a parallel circuit will extend from bar 208, contacts 227a, corresponding print magnet 64, wire 220, to source S and the item entered will be printed. During the latter part of the cycle, cam contacts CR25 will close momentarily to complete a circuit from source S, wire 218, contacts CR24, contacts 219a (which provided a holding circuit for relay 219), contacts CR25, key release magnet 206, wire 220, to source S, thereby releasing the key set up. In this manner, items may be successively entered into the accumulator and concurrently printed, if desired.

*Sub-total printing.*—If at any time it is desired to take a sub-total, that is, print the amount standing on the accumulators without resetting the same, the sub-total key 202 is depressed and latched down whereupon contacts 230 will be open to break the circuit through magnet 227 and contacts 232, 233, and 234 will be closed. Closure of contacts 233 completes a circuit after the motor bar contacts 217 have been closed and relay 219 energized and held, as follows: from source S, wire 220, contacts 219b, wire 231, contacts 233, magnet 215, wire 218 to source S. The printing mechanism will commence to operate and the following circuit will then be completed: from source S, wire 220, contacts 219b, wire 231, contacts 234, contacts M8, wire 235, relay magnet 100, wire 236, to source S. Magnet 100 will close its contacts 100a. A parallel circuit from contacts 234 will also be traceable through contacts M7, wire 237, magnet 99, wire 236, to source S to energize magnet 99 and close its contacts 99a so that contacts 99a jointly with the contacts 100a, complete a circuit through magnet 95 traceable from source S, magnet 95, contacts 99a, 100a, contacts M4, to source S.

This circuit is completed at the beginning of the entering portion of the cycle and the emitters D7 and D8 commence to emit impulses to the magnets 76 and 77 to advance each unit a complete revolution during which circuits will be completed to the print magnets 64 at differential times to read out amounts standing in the several orders.

Closure of contacts 232 completes a circuit from source S to wire 231 as before, contacts 232, wire 240, relay magnet 241, wire 236, to source S. Magnet 241 closes contacts 241b and opens contacts 241c. As the brushes 91 of the several orders rotate through this complete revolution, they will bridge the zero contact segments 92 as the type elements corresponding to the amounts on the element arrive in printing position and a circuit will be completed in each order which is traceable from source S, wire 220, print magnet 64, wire 242, contacts 241b, segments 92, and brush 91, wire 243, contacts 93b, previously closed as the brushes 91 bridged segments 93 in the manner explained in connection with the preferred form, wire 244, impulse distributor D10, wire 218 to source S.

After this circuit has been completed, the accumulator unit will advance the remainder of a revolution to occupy the same position it held at the commencement of the cycle. In other words, each accumulator order is sent through a complete revolution, at differential times during which, the circuit just traced is completed to interrupt the type bar in position to print the amount standing on the element.

*Grand total printing.*—If it is desired to clear the accumulators, the grand total key 203 is depressed to open contacts 229 and close contacts 245, 246, 247, and 248. Contacts 247 are wired in parallel with contacts 234 of the sub-total key and complete circuits in a similar manner through contacts M7 and M8 to energize magnets 99 and 100 for the purpose of initiating a cycle of the accumulator elements as before.

Contacts 248 close to control the printing of an asterisk under control of a print magnet 64a to indicate that the amount printed is a grand total. Contacts 246 are in parallel with contacts 233 and serve to energize the printer clutch magnet 215 in the same manner. Contacts 245 complete a circuit from source S, wire 220, contact 219b, wire 231, contacts 230, contacts 245, wire 249, relay magnet 103, wire 218, to source S. Magnet 103 closes its contacts 103b and 103d which will control the resetting and total printing circuits respectively.

With magnet 95 energized, its holding circuit is traceable from source S, magnet 95, contacts 95a, contacts 99c, wire 251, contacts 97d, wire 252, contacts M1, M2, wire 218 to source S.

As the accumulating element arrives in zero position a printing circuit will immediately be completed as follows: from source S, wire 218, distributor D11, contacts 103b, wire 243, brush 91 and segments 92, contacts 241c, wire 253, contacts 103d, wire 242, print magnet 64, wire 220 to source S. The digit on the element will accordingly be positioned for printing as before. At the same time, a further circuit branches at contacts 241c, running through wire 254, magnet 97, wire 255 to source S. Magnet 97 opens its contacts 97d to interrupt the holding circuit of magnet 95 and further advance of the element is thereby prevented, leaving the same in zero position.

While there has been shown and described and pointed out the fundamental novel features of the invention as applied to two modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. In an accounting machine controlled by perforated cards, a rotatable accumulating element responsive to alternately established magnetic fields which are angularly related, means for separately establishing a pair of magnetic fields across said element and angularly disposed with respect to each other, record sensing means and means controlled thereby for causing said first named means to establish said fields in alternate succession whereby said element will be advanced by increments.

2. In an accounting machine controlled by perforated cards, a rotatable accumulating element responsive to successively established magnetic fields which are angularly related, means for separately establishing a plurality of magnetic fields across said element, said fields being angularly disposed with respect to each other, record sensing means and means controlled thereby for causing said first named means to establish said fields in succession to effect step by step advance of said element.

3. In a record controlled accounting machine, record sensing means, a rotatable accumulating element responsive to successively established magnetic fields which are angularly related, means for establishing a magnetic field across said element in one direction to hold the same in position, means controlled by said sensing means for rendering said establishing means ineffective and means controlled by said record sensing means, when said first named establishing means is rendered ineffective, for establishing a second magnetic field across said element in another direction to cause rotation of said element.

4. In a machine of the class described, an accumulating unit comprising a rotor responsive to alternately established magnetic fields and a pair of electromagnets, means for alternately energizing said electromagnets to cause said rotor to advance one step for each energization, a circuit normally effective to maintain one of said magnets constantly energized to hold the rotor in position, record sensing means, and means controlled thereby in response to a perforation in a record for breaking said circuit and for causing said alternately energizing means to become effective.

5. In a machine of the class described, means for feeding record cards having differentially positioned index points, an accumulator element responsive to alternately established magnetic fields which are angularly related, means including magnets for establishing a magnetic field across said element in one direction, means including magnets for establishing a second magnetic field across said element in another direction, said first and second named magnets being energized in alternating sequence, record sensing means and means controlled thereby to cause repeated alternate energization of said first and second named magnets.

6. In a machine of the class described, means for feeding record cards having differentially positioned index points, an accumulator element responsive to alternately established magnetic fields which are angularly related, means for establishing a magnetic field acros said element in one direction, means for establishing a second magnetic field across said element in another direction, means for causing operation of said establishing means to alternately establish said magnetic fields a predetermined number of times, record sensing means and means controlled thereby in response to a hole in a record for controlling the operation of said causing means to limit the number of alternate operations in accordance with the differential location of the hole in the record.

7. The invention set forth in claim 5 comprising means to prevent retrograde movement of said element.

8. In an accounting machine, an accumulator comprising a rotatable accumulating element responsive to alternately established magnetic fields, means for alternately establishing said fields across said element, record sensing means, means controlled by a part of said sensing means for causing said establishing means to effect a series of alternations of said fields and means controlled by another part of said sensing means for causing said establishing means to interrupt said series of alternations at a time dependent upon the differential location of a perforation in the record.

9. In a machine of the class described, a rotatable accumulating element responsive to alternately established magnetic fields, means for alternately and repeatedly establishing a pair of magnetic fields across said element to cause rotation thereof, means for initiating the operation of said means and means controlled by said element as it reaches zero position for interrupting the operation of said first named means.

10. In a machine of the class described, a rotatable accumulating element responsive to successively established magnetic fields, means for repeatedly establishing a succession of magnetic fields across said element to cause step by step advance thereof, means for initiating the operation of said means and means controlled by said element for determining the number of repeated operations to be performed by said first named means.

11. In an accounting machine, a denominational order accumulating unit having a plurality of field magnet structures and an accumulating armature arranged to be influenced to rotate by the magnetic flux as each structure is energized, means including a single pair of impulse emitters for successively energizing the field magnets of the order and means controlled by the armature for rendering the successively energizing means ineffective after the repeated energization of said field magnet structures a number of times sufficient to advance the accumulating armature to zero position.

12. In an accounting machine, means for feeding records through the machine, an accumulator unit responsive to alternately established magnetic fields, magnets for alternately establishing magnetic fields across said unit, a pair of emitters for alternately emitting a series of electrical impulses, said magnets being responsive to said impulses, means for connecting said emitters to said magnets at differential times to cause certain of said impulses to energize said magnets, record sensing means, and means controlled thereby in response to a hole in a record for operating said connecting means.

13. In a machine of the class described, an accumulating unit comprising a rotor responsive to angularly related and alternately established magnetic fields and a pair of electromagnets for establishing said fields, means for alternately energizing said electromagnets to cause said rotor to advance one step for each energization, a circuit normally effective to maintain one of said magnets constantly energized to hold the rotor in position and means for breaking said circuit and for causing said alternately energizing means to become effective.

14. In a machine of the class described, an accumulating unit comprising a rotor responsive to alternately established magnetic fields and a pair of electromagnets, means for alternately energizing said electromagnets to cause said rotor to advance one step for each energization, a circuit normally effective to maintain one of said magnets constantly energized to hold the rotor in position, a key and means controlled by said key for breaking said circuit and for causing said alternately energizing means to become effective.

15. In a machine of the class described, a set of keys, each key being settable to represent a different digit, an accumulator element responsive to alternately established magnetic fields which are angularly related, means including magnets for establishing a magnetic field across said element in one direction, means including magnets for establishing a second magnetic field across said element in another direction, means for energizing said first and second named magnets in alternating sequence a predetermined number of times, means for sensing which key is set and means controlled thereby for controlling the operation of said energizing means to limit the number of alternate energizations of said first and second named magnets in accordance with the digital value of the set key.

16. In an accounting machine, a denominational order accumulating unit having a plurality of angularly related field magnet structures and an armature arranged to be influenced to rotate by the magnetic flux as each structure is energized, said armature having a plurality of rotative positions, means including a single pair of impulse emitters for emitting a predetermined number of electrical impulses to energize said magnet structures in succession, an element positionable by said armature in accordance with its rotative position, means for rendering said emitters effective to cause rotation of said armature and means controlled by said element when it is in a predetermined rotative position for rendering said emitters ineffective.

JAMES W. BRYCE.